No. 692,850. Patented Feb. 11, 1902.
P. T. HANDIGES.
CAR COUPLING.
(Application filed Apr. 13, 1901.)
(No Model.) 2 Sheets—Sheet 1.

WITNESSES.
O. B. Baenziger
M. Hickey

INVENTOR.
Philip T. Handiges
By Newell S. Wright
His Attorney

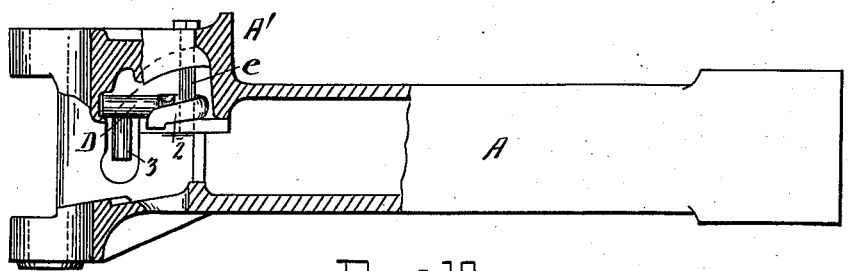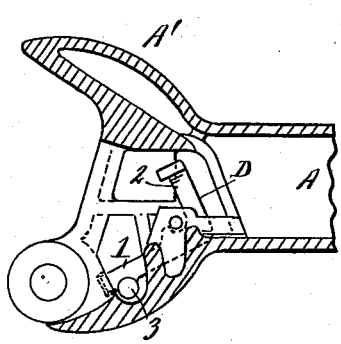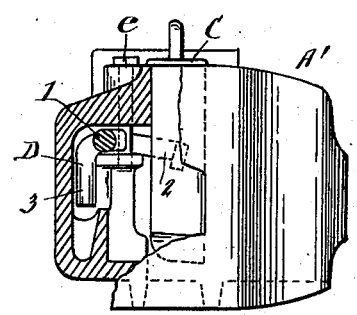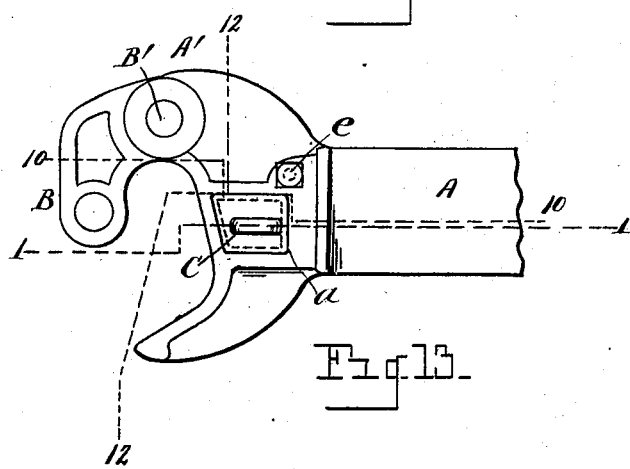

UNITED STATES PATENT OFFICE.

PHILIP T. HANDIGES, OF DETROIT, MICHIGAN, ASSIGNOR, BY DIRECT AND MESNE ASSIGNMENTS, TO THOMAS H. SIMPSON, TRUSTEE, AND MICHIGAN MALLEABLE IRON CO., OF DETROIT, MICHIGAN, A CORPORATION OF MICHIGAN.

CAR-COUPLING.

SPECIFICATION forming part of Letters Patent No. 692,850, dated February 11, 1902.

Application filed April 13, 1901. Serial No. 55,616. (No model.)

*To all whom it may concern:*

Be it known that I, PHILIP T. HANDIGES, a citizen of the United States, residing at Detroit, county of Wayne, State of Michigan, have invented a certain new and useful Improvement in Car-Couplers; and I declare the following to be a full, clear, and exact description of the invention, such as will enable others skilled in the art to which it appertains to make and use the same, reference being had to the accompanying drawings, which form a part of this specification.

My invention has reference to certain new and useful improvements in car-couplers, and has among its objects superior simplicity and economy of construction and operation.

To this end my invention consists of the construction, combination, and arrangement of devices and appliances hereinafter described and claimed, and illustrated in the accompanying drawings, in which—

Figure 1:
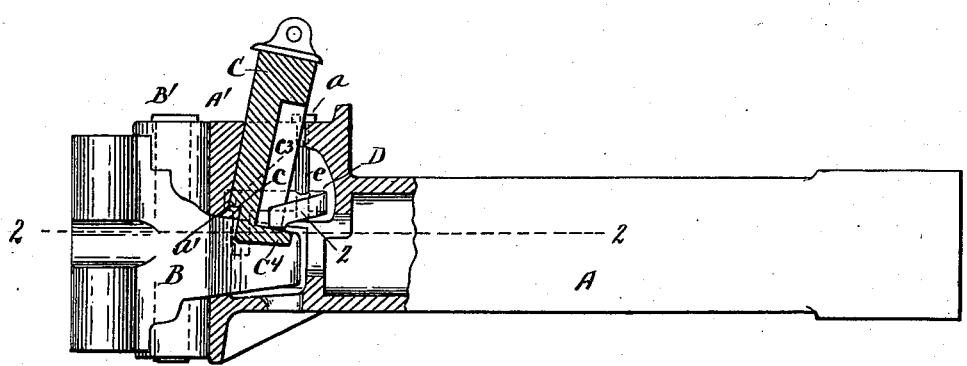
Figure 2:
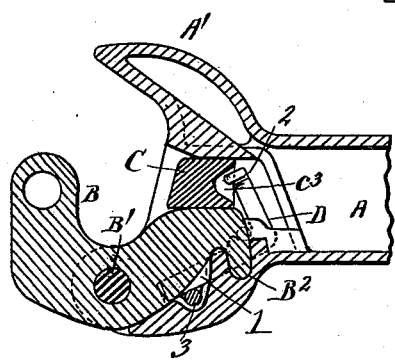
Figure 4:
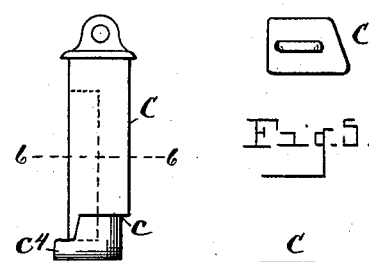
Figure 5:
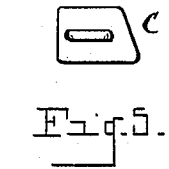
Figure 3:
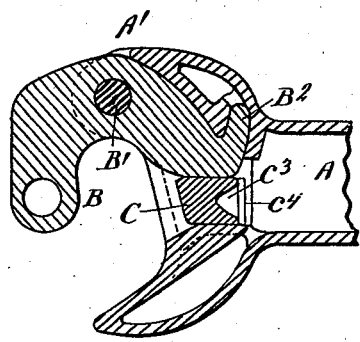
Figure 7:
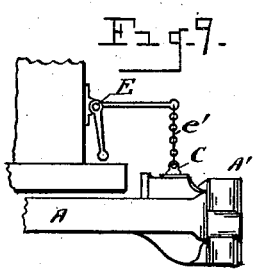
Figure 6:
Figure 8:
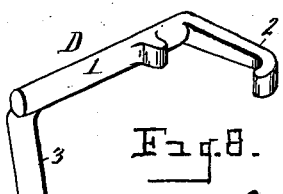

Figure 1 is a view in vertical section, showing parts in elevation. Fig. 2 is a view in horizontal section on the line 2 2, Fig. 1, looking up, the figure being inverted. Fig. 3 is a similar section showing the locking-pin in locked position, said section looking downward. Fig. 4 is a detail view of the locking-pin in elevation. Fig. 5 is a plan view of the same. Fig. 6 is a horizontal section on the line 6 6, Fig. 4. Fig. 7 is an inverted plan view of the pin. Fig. 8 is a view in perspective of the knuckle-opening device or rocking lever. Fig. 9 is a view in elevation, showing a lifting device for lifting the locking-pin. Fig. 10 is a view of the draw-bar, partly in vertical section, showing parts in elevation, the locking-pin being removed. Fig. 11 is a view in horizontal section on the line 2 2, Fig. 1, with the knuckle removed. Fig. 12 is a view partly in front elevation and partly in vertical cross-section. Fig. 13 is a plan view.

Heretofore in analogous devices if the knuckle is closed when not connected with another car it has been necessary in order to make a coupling for the party making the coupling first to step in front of the car and lift the pin and open the knuckle, which has been found to be a dangerous proceeding.

My invention is designed to provide means whereby in such a case the pin may be lifted and the knuckle opened without the necessity of an attendant stepping between the rails.

I carry out my invention as follows:

In the drawings, A represents a draw-bar provided with a head A' and a knuckle B, the head being suitably chambered to admit the adjacent portion of the knuckle.

B' is the pin holding the knuckle in place.

Except as hereinafter described the draw-bar head and knuckle may be of ordinary construction within the scope of my invention, the head being formed with a vertical orifice extended therethrough, as shown at $a$, for the reception of a locking-pin or analogous device, (indicated at C.) The head is formed with a shelf or flange at $a'$, projecting into the orifice $a$ above the knuckle-receiving chamber. The shelf is preferably located upon the front wall of the orifice $a$; but I do not limit myself thereto.

The locking device C, it will be understood, may be connected to any suitable lifting device and is constructed with a shoulder $c$ to engage and seat upon the shelf $a'$ of the head. The lower end of the pin projects below the shoulder $c$, said shoulder preferably extending diagonally across the pin, as shown, leaving the lower projecting end of the pin of corresponding form. The shoulder $c$ is also preferably cut away on a bevel or slight arc on its inner surface, as indicated at $c^2$. The pin is formed with a longitudinal opening or recess, (indicated at $c^3$,) said recess being closed at the lower end, the pin being formed with a ledge $c^4$ at the lower end thereof, said ledge preferably projecting laterally beyond the upright plane of the body of the pin thereabove.

To open the knuckle, I provide a knuckle-opening device or rocking lever, (indicated at D and shown in detail in Fig. 8,) said lever provided with a central body portion 1, with an arm 2 at one end thereof to engage in the recess $c^3$ of the pin C and with an arm 3 at the opposite end thereof to contact with the adjacent face of the knuckle as the lever is properly actuated and force the knuckle out of the chamber of the draw-head into open position. The lever D has a rocking engagement in the head of the draw-bar, said head being suitably chambered to receive the knuckle-opening device. The lever may be held in place by any suitable means, as by a bolt or analogous device e, in front of the body portion 1 thereof. This construction and arrangement leaves the lever D free to rock within the head. Said lever is actuated by the locking-pin C and is so located and arranged that the pin may be elevated so as to seat its shoulder c upon the shelf a' of the head without the rocking lever D being operated thereby. When the pin is thus seated upon said shelf, the ledge $c^4$ is thereby brought closely under or into contact with the outer end of the arm 2 of said lever. It will be obvious that when the pin C is in this position further elevation thereof by the lifting device engaged therewith will cause the ledge $c^4$ as the pin is lifted to strike the arm 2 of the lever D and carry the arm 2 upward, causing the lever D to rock on its body portion 1, thereby lifting the arm 3 and forcing it forward into engagement with the adjacent portion of the knuckle, thus opening the knuckle. When the lever D is in normal position, the arm 3 will drop back into its chamber within the head out of the way of the knuckle, avoiding all liability of breakage in the operation of the coupler. The inner end of the knuckle is formed with a tailpiece $B^2$, projecting rearward and outward into a suitable recess or chamber in the head, permitting the inner end of the knuckle to swing into the head out of the way of the locking-pin.

In coupling, it will be understood, the pin is first seated upon the shelf a'. In unlocking the coupling, when the cars are coupled together the locking-pin C can only be raised high enough to be seated upon the shelf a', this being its position for uncoupling. When in this position, it does not operate the knuckle-opening device, the knuckle-opening device being only operative when the knuckle is closed and not coupled with another car. In other words, the only time when the knuckle-opening device is operative is when the knuckle is closed and not coupled with another coupler when it becomes desirable to open the knuckle to make a coupling. When the pin has been elevated sufficiently high to operate the knucke-opener and open the knuckle, the pin is allowed to fall back into its normal position, the knuckle-opening device falling back by gravity into its normal position also, where it cannot be injured by the closing of the knuckle. The locking-pin C is knocked off the shelf a' by opening the knuckle, the pin then falling onto the tail of the knuckle. The tail of the knuckle is always under the pin when the knuckle is open. When the knuckle closes, it rides out from under the pin, permitting the pin to drop into locked position.

It will be observed that the knuckle-opener or lever acts also as a retainer for the locking-pin, inasmuch as the arm 2, projecting into the recess $c^3$, prevents the pin C from being lifted out of the draw-head. The knuckle-opener also serves to seat the pin C upon the shelf a', inasmuch as the pin seats itself on the shelf when it strikes against the arm 2 of the knuckle-opener as the pin is raised, thereby throwing the upper end of the pin rearward and the lower end of the pin back upon the shelf.

While I do not confine myself to any particular lifting mechanism, yet I show in Fig. 9 a customary crank-arm E, designed to project to the side of the car or otherwise, as may be desired, said crank-arm connected with the pin C by a chain e'.

What I claim as my invention is—

1. The combination with a coupler-head, of a swinging knuckle, a vertically-movable locking device seating upon a portion of said head when in raised position, and a knuckle-opening device actuated by the further lifting of the locking device off its seat.

2. The combination with a coupler-head, of a swinging knuckle, a vertically-movable locking device seating upon a portion of said head when in raised position, and a knuckle-opening device actuated by the lifting of the locking device off from its seat, said knuckle-opening device restored to normal position by gravity when free to move.

3. The combination with a coupler-head provided with a vertical orifice therein, and with a shelf projecting into the path of said orifice, of a swinging knuckle, a vertically-movable locking-pin in said orifice constructed to seat upon said shelf, and a knuckle-opening device actuated by the lifting of the locking device off its seat, said knuckle-opening device contacting with the locking device causing the locking device to seat upon said shelf when the locking device is in raised position.

4. The combination with a coupler-head, of a swinging knuckle, a vertically-movable locking device seating upon a portion of said head when in raised position, a lifting device to lift the locking-pin, and a knuckle-opening device actuated by the lifting of the locking device, whereby the locking device may be lifted by the lifting device to its seat in the head, and whereby by a further operation of the lifting device, the locking device will actuate the knuckle-opening device to open the knuckle.

5. The combination with a coupler-head, of a swinging knuckle, a vertically-movable locking-pin seated upon a portion of said head when in raised position, and constructed with a longitudinally-extending recess, and a knuckle-opening device constructed with an arm projecting into the recess of the locking-pin, said knuckle-opening device actuated by the lifting of the locking device.

6. The combination with a coupler-head, of a swinging knuckle, a vertically-movable locking device seating upon a portion of said head when in raised position, a knuckle-opening device actuated by the lifting of the locking device, said locking device constructed with an elongated recess, and with a ledge at its base, and said knuckle-opening device constructed with an arm projecting into said recess above said ledge.

7. The combination with a coupler-head, of a swinging knuckle, a vertically-movable locking device seating upon a portion of said head when in raised position and a knuckle-opening device actuated by the lifting of the locking device, said knuckle-opening device constructed with an arm to engage the adjacent end of a knuckle and the opposite end of the knuckle-opening device constructed with an arm engageable by the locking device.

8. The combination with a coupler-head, of a swinging knuckle, a vertically-movable locking device seating upon a portion of said head when in raised position, and a knuckle-opening device located within a chamber in the head actuated by the lifting of the locking device, said knuckle-opening device serving to retain the locking device from disengagement from the head.

9. The combination with a coupler-head, of a swinging knuckle, a vertically-movable locking device seating upon a portion of said head when in raised position, a rocking lever located within a chamber in said head actuated by the further lifting of the locking device off its seat, and means to hold the rocking lever in place within the head.

In testimony whereof I sign this specification in the presence of two witnesses.

PHILIP T. HANDIGES.

Witnesses:
N. S. WRIGHT,
M. HICKEY.